May 25, 1926.　　　　　　　　　　　　　　　　　1,586,201
F. KAUFFMANN
MANOMETER FOR LIQUID LEVEL INDICATORS
Filed Feb. 26, 1925
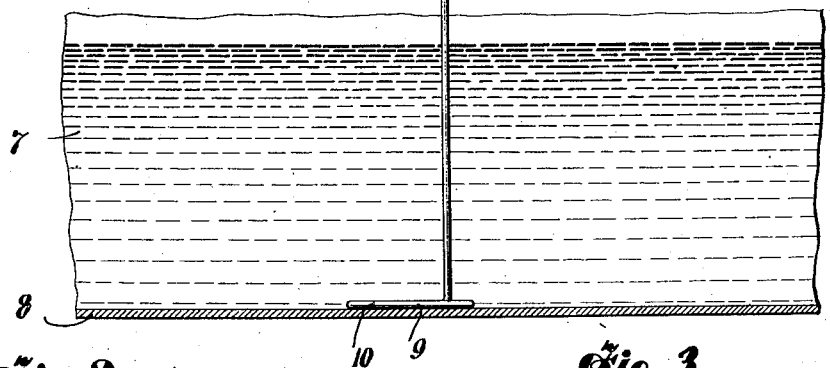
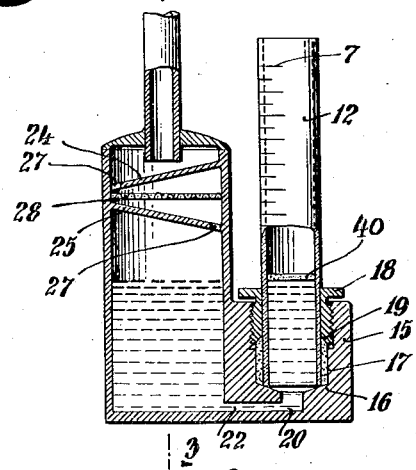
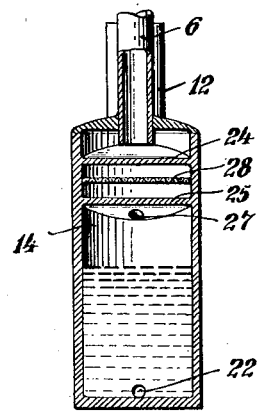
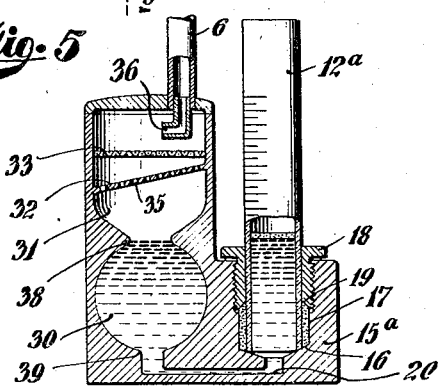
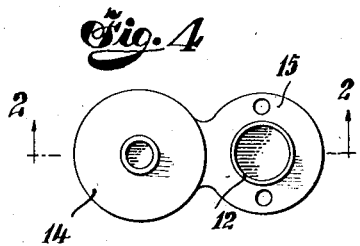
INVENTOR
Frederick Kauffmann.
BY
Townsend & Decker
ATTORNEY Patented May 25, 1926.

1,586,201

UNITED STATES PATENT OFFICE.

FREDERICK KAUFFMANN, OF NEW YORK, N. Y., ASSIGNOR TO AUTOMOTIVE GAUGE CO., INC., A CORPORATION OF DELAWARE.

MANOMETER FOR LIQUID-LEVEL INDICATORS.

Application filed February 26, 1925. Serial No. 11,657.

This invention relates to pressure indicating devices and particularly to indicating manometers for use with liquid level indicators.

The invention has for its object the provision of an open manometer so constructed that the liquid in the reservoir side thereof will not splash or otherwise pass into the conducting conduit.

The invention has for a further object the provision of a suitable bubble breaking device mounted in the reservoir above the liquid therein so that air can be forced or drawn in through the manometer to replenish the air supply operating the same.

Other and more specific objects will appear as the description proceeds.

Referring to the drawings:—

Fig. 1 is an elevational view of one form of my invention as applied to a fuel tank of an automobile.

Fig. 2 is a sectional view taken substantially on the line 2—2 of Fig. 4.

Fig. 3 is a section taken on the line 3—3 of Fig. 2.

Fig. 4 is a plan view of the manometer.

Fig. 5 is a sectional view of a modified form of my invention.

Referring to the drawings in detail, there is shown my improved manometer 5 connected by a suitable tubular conduit 6 to a receptacle 8 adapted to contain a body of liquid 7. The conduit 6 has a suitable compensating mechanism 9 adjacent the open end 10 thereof and suitably mounted adjacent the low liquid level of the receptacle. The details of the temperature compensating mechanism 9 form no part of the present invention it being understood that as the head of liquid rises within the receptacle 8 the liquid enters the compensating mechanism 9 to create pressure in the conduit 6 terminating in the manometer 5. The manometer 5 is formed with a sight glass 12 and a reservoir 14 forming the two legs of the manometer. The reservoir 14 carries, preferably integrally therewith, the extension 15 for the sight glass 12. The extension 15 is suitably bored to provide an abutting seat 16 against which the lower end of the sight glass 12 rests and to provide a pocket 17 to receive suitable packing material which is compressed by the screw-threaded nut 18 surrounding the sight glass 12 and screwed into the head or extension 15. The lower portion of the nut 18 is preferably formed with the conical surface 19 so as to firmly compress the packing material around the bottom of the sight glass 12. The reservoir portion 14 is connected to the dished bottom 20 in the bottom of the extension 15 by means of the restricted passage 22.

The manometer herein disclosed is designed primarily for use in measuring the liquid in fuel supply tanks of automobiles. It is considered desirable to be able to replenish the air in the conduit without disturbing the parts thereof and without opening the line between the two liquid seals at the end of the line. The most convenient way to do this is to pump or draw the air through the manometer into the conduit 6. For this reason the upper portion of the reservoir 14 of the manometer is preferably formed with two inclined baffle plates 24 and 25 vertically spaced and inclined in opposite directions. Each plate is provided adjacent the lower-most portion thereof with an aperture 27 so that any liquid which passes the baffle plate will be allowed to flow back into the reservoir. Between the baffle plates 24 and 25 is mounted the screen 28 which prevents any bubbles from passing up through the top of the reservoir. The screen 28 may be placed between the baffle plates 24 and 25 or above both plates. The upper baffle plate 24 is used as an additional precautionary member and the device could be used with this plate omitted.

I have shown a luminous float 40 which may be employed so that the height of liquid in the sight glass 12 may be detected in the dark. The float, which has a smaller diameter than the bore of the glass 12 may be formed of phosphorus or cork coated with phosphorous or other luminous substance and is preferably porous or apertured so as not to interfere with the passage of all of the liquid from the tube 12 to the reservoir 14.

In Fig. 5, I have shown a modified form of my invention in which the reservoir chamber is divided into a reservoir part proper 30 and a chamber 31 above the same in which is mounted one baffle plate 32 and a screen 33 as in the first form of the invention. The baffle plate 32 in this form of the invention is shown as provided with a number of perforations 35 it being contemplated to use one or more perforations in the baffle plates as desired. A tubular conduit 6 enters the upper part of the reservoir chamber and preferably has the angular extension 36 which assists in damping the current of air into or out of the chamber and which assists in keeping the liquid out of the transmitting conduit 6. The liquid containing reservoir 30 is shown as substantially spherical, that is, with the upper and lower parts 38 and 39 thereof having relatively small horizontal cross sectional areas compared with the central portion of the reservoir. This particular form of reservoir is to be used with a non-rectangular liquid tank, for example a circular tank. The function of the particular construction of the reservoir 30 is to decrease the manometer readings due to changes of height of the liquid when the tank is nearly full or empty and to increase the stroke of liquid in the manometer when the tank is about half full. This is accomplished by the structure shown since any pressure entering the chamber 31 causes a corresponding decrease in the height of liquid in the reservoir 30. As the liquid rises a certain distance in the sight glass 12$^a$ the pressure entering the chamber 31 would accordingly be balanced by a lesser rise in the sight glass 12$^a$ when the tank is nearly full or nearly empty and the stroke would be accordingly smaller than when the surface of the indicating liquid is about the center of the reservoir 30, since the same increase of pressure would not cause such a large decrease in the height of liquid in the reservoir where it has a larger cross sectional area and where the change in the head of liquid in the manometer would nearly all be registered in the sight glass 12$^a$.

The construction of the manometer body part 15$^a$ in which is secured the glass 12$^a$ is substantially the same as that shown in the first form of the invention.

The operation of the device is believed clear from the foregoing description. It is obvious that the splash of the liquid in the reservoir will not cause the liquid to reach the transmitting conduit and that I may safely introduce air into the conduit through the sight glass 12 or 12$^a$ without causing any of the indicating liquid to pass into the conduit 6. The screen 28 or 33 effectually stops the bubbles from passing above the same.

While I have shown and described certain specific embodiments of my invention it is to be understood that these are merely illustrative and that I am to be limited only as set forth in the appended claims.

I claim as my invention:—

1. An indicating manometer formed with an indicating tube and a liquid reservoir communicating therewith, said reservoir being provided with a baffle plate above the normal liquid level therein and a screen extending across said reservoir for the purpose set forth.

2. A manometer provided with a sight element and a liquid reservoir, said liquid reservoir containing a screen placed thereacross above the normal liquid level therein.

3. A manometer provided with a sight element and a liquid reservoir communicating therewith, said reservoir being provided with a baffle plate and a screen said screen lying above said baffle plate, said screen being spaced from the top of said chamber.

4. An indicating mechanism adapted to be used with a liquid containing reservoir, said mechanism including a pressure indicating device adapted to contain an indicating liquid and a transmitting conduit, said pressure indicating device including a liquid containing reservoir communicating with the interior of said conduit and provided with an aperture baffle plate positioned between the normal high liquid level therein and the point of communication between said conduit and reservoir.

5. In a manometer, a liquid reservoir, a tubular member extending into the upper portion of said reservoir, a baffle plate extending across said reservoir in spaced relation to said conduit, said baffle plate being provided with a plurality of spaced apertures.

6. In a manometer, a liquid supply reservoir, a pressure transmitting conduit enclosing a pressure conducting medium and extending to and operatively associated with a portion of said reservoir above the normal high liquid level therein, and baffle means providing a tortuous path for said conducting medium between the normal high liquid level in said reservoir and said conduit, said baffle means permitting any liquid contacting therewith to drain by gravity back into said reservoir.

Signed at New York in the county of New York and State of New York this twentieth day of February, A. D. 1925.

FREDERICK KAUFFMANN.